Oct. 29, 1946.  F. G. KELLY  2,410,218
THERMOPILE FOR FIRE ALARM SYSTEMS
Filed May 13, 1942  2 Sheets-Sheet 1
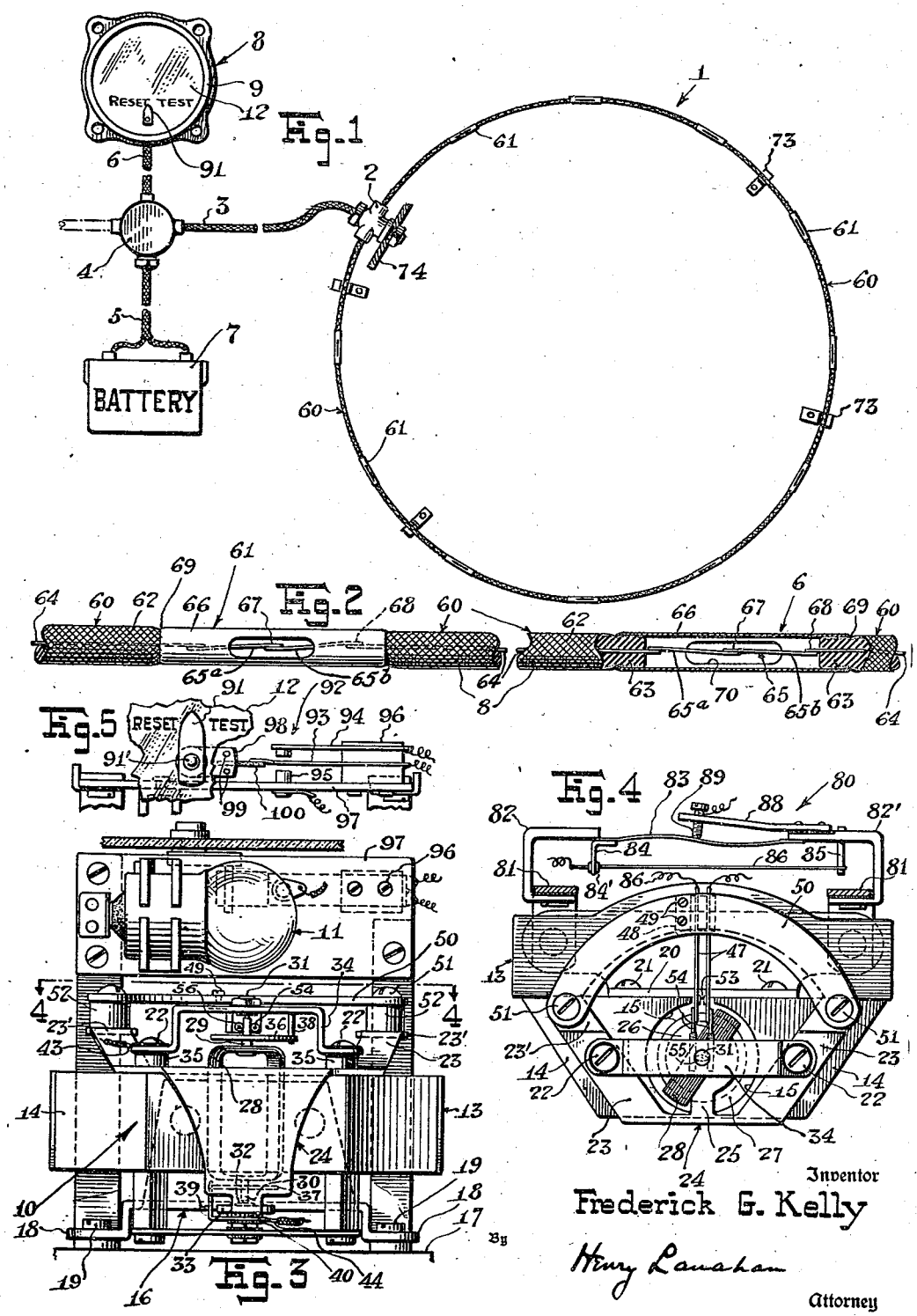
Inventor
Frederick G. Kelly
Henry Lanahan
Attorney Oct. 29, 1946.　　　F. G. KELLY　　　2,410,218
THERMOPILE FOR FIRE ALARM SYSTEMS
Filed May 13, 1942　　　2 Sheets-Sheet 2
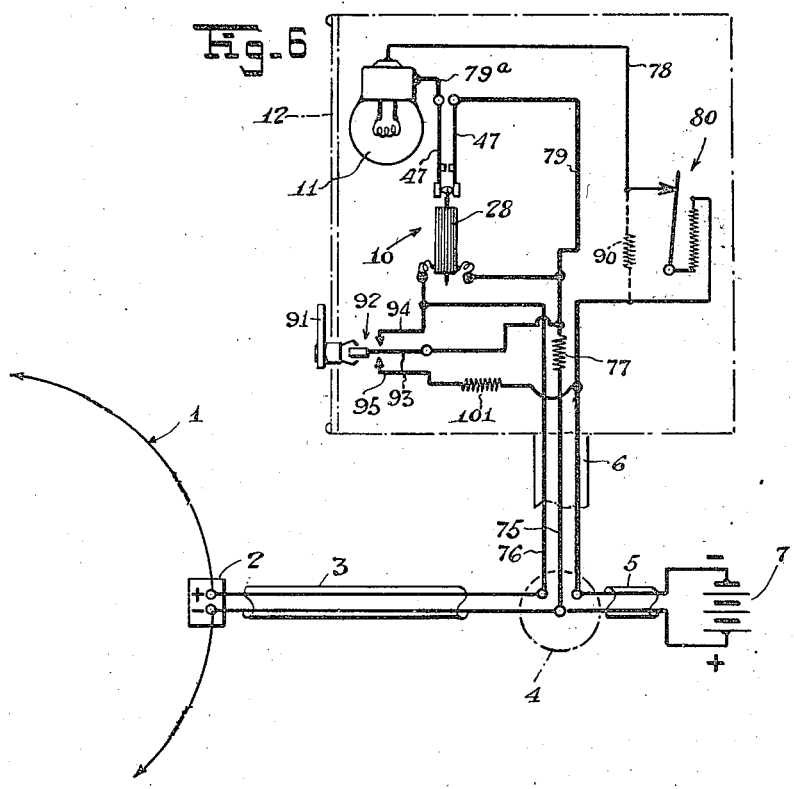
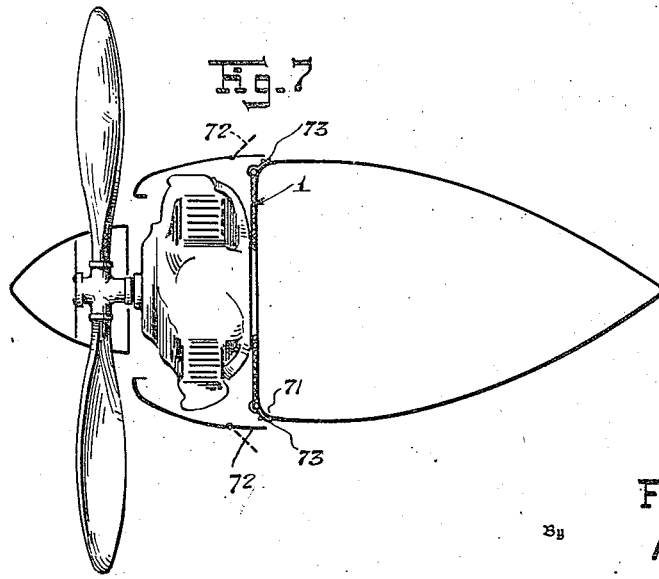
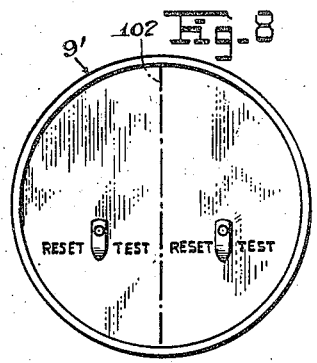
Inventor
Frederick G. Kelly
By Henry Lanahan
Attorney Patented Oct. 29, 1946

2,410,218

UNITED STATES PATENT OFFICE 2,410,218

THERMOPILE FOR FIRE ALARM SYSTEMS

Frederick G. Kelly, West Orange, N. J., assignor to Thomas A. Edison, Incorporated, West Orange, N. J., a corporation of New Jersey Application May 13, 1942, Serial No. 442,759

5 Claims. (Cl. 136—4)

This invention relates to fire alarm systems and more particularly to thermopiles for fire alarm systems of the thermocouple type.

My invention is especially suited for use on airplanes for detecting engine oil fires, or fires in mail compartments, etc., but it will be understood the invention is not limited to this application.

A thermocouple alarm system for use on airplanes must be capable of withstanding heavy vibration and rapid changes in ambient temperature without producing any false alarms. The present invention is adapted to meet these requirements reliably by very simple apparatus and circuit arrangement. The apparatus for controlling the alarm comprises an improved thermopile, or thermocouple harness, and a sensitive meter relay of rugged construction and stable operation, the relay itself however forming the subject matter of a separate application Serial No. 442,760, filed on even date herewith, now Patent No. 2,395,669, dated February 26, 1946. These elements are interconnected in a circuit arrangement to provide a steady alarm when once the alarm is set off. However, ready means are provided by which the aircraft pilot may terminate the alarm and set the system for reoperation and by which he may also test the entire alarm system to check if it is in proper working condition.

A thermopile for a fire alarm system on an airplane must have certain definite thermal characteristics. For example, the thermopile must be capable of undergoing rapid changes in ambient temperature without setting the alarm in action; yet, any one of the thermocouples of the thermopile must be capable of generating sufficient power to set the alarm in action when that thermocouple is exposed to a sudden dangerously high temperature, and to do that within a limited exposure time of not more than a few seconds.

It is an object of my invention to provide an improved thermopile, and improved thermocouples therefor, capable of fulfilling the above mentioned requirements.

It is another object to provide an improved thermopile especially adapted for detecting engine oil fires. In this respect, my invention is concerned with the provision of a thermocouple harness adapted for easy mounting in proper relation to an engine, especially an airplane engine of the radial type.

Another object is to provide a thermocouple harness adapted to operate dependably when placed in the cooling air stream of an airplane engine.

A further object is to provide a housing for a thermocouple of new and improved design which is adapted to support the thermocouple reliably and to differently expose the hot and cold junctions of the thermocouple to obtain the desired thermal characteristics above mentioned.

It is another object to provide improved means and arrangement in a fire alarm system to enable the system to be readily checked for operability.

It is another object to test the entire alarm system in one operation by utilizing the power source provided for the alarm proper.

It is another object in an electrical alarm system to utilize the controlled current to maintain the alarm in steady state of operation when once the alarm is set off.

It is another object to provide a single control for an alarm system selectively operable to test the system for operability or to set the system for reoperation.

Other and allied objects and features of my invention will more fully appear from the following description and the appended claims.

In the description of my invention reference is had to the accompanying drawings of which:

Figure 1 is a view showing the arrangement of a fire alarm system for an airplane, as constructed according to my invention;

Figure 2 is a view showing two sections of the thermocouple harness approximately to actual size, one section being in elevation and the other partially in section;

Figure 3 is a detailed elevational view of the control and alarm apparatus contained in the instrument case of Figure 1;

Figure 4 is a sectional view taken on the line 4—4 of Figure 3;

Figure 5 is a fractional plan view of the structure of Figure 3;

Figure 6 is a schematic view showing the circuit arrangement for the fire alarm system;

Figure 7 is a fractional view of an airplane of the radial engine type showing the thermocouple harness mounted thereon in proper relation thereto; and Figure 8 is a view illustrating the arrangement in the instrument case for a dual alarm system.

The present fire alarm system, which has the general arrangement shown in Figure 1, comprises a thermopile or thermocouple harness 1 connected by a T connector 2 and cable 3 to a junction box 4. Also connected to this junction box, by respective cables 5 and 6, are a battery 7 and a control and alarm apparatus generally referred to as 8, this apparatus being housed in an instrument case 9 adapted for panel mounting as is shown.

It will be understood that the thermopile acts as a detector and is to be placed in the vicinity of a possible fire, and is to generate a voltage to set the alarm system into operation should a fire or dangerously high temperature occur in that vicinity. This generated voltage of the thermopile is used to actuate a relay 10 which in turn controls a current from the battery 7 to actuate a suitable alarm. In the present example, the alarm constitutes a lamp 11 placed in the instrument case 9 behind a ruby glass 12 to provide a red light as is customary for this purpose.

The control relay 10 is a meter relay of the D'Arsonval type, and is the same relay as is described and claimed in my aforementioned Patent No. 2,395,669. The relay comprises a permanent magnet 13 having pole pieces 14 terminating into adjacent cylindrical faces 15. This magnet structure is mounted by means of a bracket 16 onto a base 17 which forms the back end wall for the instrument case 8, the bracket having depending legs 18 secured by screws 19 to the base and an upstanding arm 20 secured by screws 21 to the inner side walls of the pole pieces. Secured by screws 22 to the top walls of the pole pieces are two diverging arms 23 of a bracket 24 which depends down along the outer sides of the pole pieces. This bracket has a top central horizontal arm 25 which carries a core piece 26 in a position centralized between the faces 15 of the pole pieces. There is thus formed an annular air gap 27 of constant length between the pole pieces, which gap constitutes the field for the D'Arsonval movement.

Surrounding the central core piece 26 is a rectangular coil 28. This coil has upper and lower shafts 29 and 30 in pivotal engagement with respective jewel bearings carried by respective screws 31 and 32. The screw 32 is threaded through an arm 33 turned over from the bracket 24, while the screw 31 is threaded through a transverse U-shaped bar 34 which is clamped to the pole pieces against spacers 35 by the screws 22.

Current is conducted to the coil through upper and lower spiral hair springs 36 and 37, which also serve to bias the coil to a zero position defined by the abutment of the coil against the arm 25. These springs are connected at their inner ends to respective terminals of the coil not shown, and at their outer ends to respective anchors of which that for the upper spring is a pin 38 secured to the bar 34 and that for the lower spring is a lug 39 turned up from a member 40 that is held to the screw 32. The lead connection to the upper spiral spring is made to a soldering lug 43 clamped to the bar 34 by one of the screws 22, and that to the lower spiral spring is made to a soldering lug 44 provided integrally with the member 40, these circuit connections being however isolated from the frame structure of the relay by a suitable insulating of the bar 34 and member 40.

The switch for the relay comprises a pair of spring contact arms 47 held in cantilever fashion in substantially radial relation to the upper shaft 29 of the coil 28. These springs are clamped insulatedly to a bracket 48 which is held by screws 49 to an arcuate bar 50, this bar being mounted at the top of the movement by screws 51 and spacers 52 onto upwardly-offset end portions 23' of the bracket members 23 aforementioned. The spring arms contact points 53 on their adjacent sides and are biased toward one another to urge the contact points closed by a substantial pressure. Secured to the ends of the spring contact arms are rigid members 54 which extend past opposite sides of the shaft 29. The part of this shaft between these members 54 is hardened and ground to form an oval cam 55. Under the influence of the bias of the spring contact arms 47 the members 54 bear against this cam from the opposite sides thereof. However, to prevent the cam from shorting the contact points the members 54 are provided with insulating glass coatings 56.

When the coil 28 is in zero position the cam 55 occupies a position wherein its major axis is at right angles to the spring contact arms, with the tips of the cam in engagement with the spring arm extensions 54, to hold the contact points at a maximum separation, this separation being however limited substantially to the minimum distance sufficient to quench any arc that may tend to form when the contact points open. When the coil is current actuated from zero position, as in a clockwise direction, the tips of the cam move off from the spring contact extensions and the contact points are closed in response to the bias of the spring arms. When the current flow through the coil is next cut off the coil is returned to zero position under the influence of the spiral springs 36 and 37 and will cam the contact points apart to their maximum separation.

In this relay a large movement of the coil is stepped down to control a minimum arc-quenching separation of the contact points. In proportion to the ratio of step-down of this movement, the contact pressure which the D'Arsonval movement is able to control is increased. This increased pressure permits a stable and reliable connection to be made between the contact points. Moreover, by wedging the cam between the spring contact arms and having the arms engage the dwells at the tips of the cam while the coil is in zero position, the contact points are prevented from being closed falsely by any mechanical vibration or shock of the instrument. These features—which are attained without any sacrifice in sensitivity of the instrument—render the instrument particularly suitable for reliable service in the present application.

Reference being had now to Figures 1 and 2 there will be seen the details of construction of the thermopile 1 provided for actuating the relay 10 just described. This thermopile may comprise a series of sections of armored cable 60 interconnected by thermocouple units 61 to form what may be termed a thermocouple harness loop. The armored cable comprises braided metal flexible tubing 62 furnished with an interior asbestos insulation 63 and a central conducting wire 64 made preferably of nickel. Each thermocouple unit comprises a thermocouple proper 65 and a rigid metal tubular housing section 66. The thermocouples proper may for example respectively comprise an alloy element 65a of Constantan and an alloy element 65b of Chromel joined to form a hot junction 67. At each junction of an armored cable section to a thermocouple unit, the nickel conducting wire 63 is welded to the thermocouple proper to form respective cold junctions 68, and the rigid metal tubing sections 66 are clamped to the ends of the flexible metal tubing 62 and are welded thereto to form strong rigid joints 69. These joints bear tightly against the insulation 63 at the ends of the armored cable sections to form firm rigid supports for the thermocouples proper. Each of these tubular housing sections 66 has a solid-walled end portion surrounding each cold junction 68 and a cage portion about the hot junction 67, which has a pair of open windows 70 forming a transverse opening through the housing for directly exposing the hot junction to the outside ambient temperature.

The provision of rigid housing and supporting sections for the thermocouples proper and of flexible armored cable sections between the thermocouples forms a strong thermocouple harness which may be readily adapted to various different applications. One particularly important application to which this harness is adapted is that of detecting oil fires from airplane engines. For example, for engines of the radial type, the harness is provided suitably in the form of a loop as is shown, the ends of the harness being joined and connected to the cable 3 by the connector 2 aforementioned. This harness loop is mounted behind the engine on the outer fire wall 71 beneath the flaps 72, as is shown in Figure 7, and is held to the fire wall by a series of clamps 73 and, additionally, by a supporting bracket 74 (fractionally shown) for the connector 2, it being understood that this connector may extend through the fire wall to lead the circuit of the harness therethrough to the dash instrument case 9. By this arrangement the thermocouples are mounted at regular intervals in the cooling air stream around the engine, in positions to detect immediately any fire that may break out from the engine.

In mounting the harness loop onto the fire wall 71, the thermocouple units are oriented so that the windows 70 will be open to the cooling air stream from the engine. The hot junctions 67 will thus be flushed constantly by the air stream and will follow closely the temperature of the stream. The cold junctions 68, however, being placed back from the windows 70, will not be exposed directly to the air stream and will lag in temperature behind that of the hot junctions. This lagging, or different rate of temperature response of the cold junction from that of the hot junction, must come within two limits: it must be small to ordinary changes in ambient temperature to which the plane is subjected in order not to initiate any false alarms; yet it must become sufficiently large when one or more of the units is exposed suddenly to a dangerously high temperature of say 1200° F. or more so that the unit will generate sufficient current and for a sufficient period to actuate the relay and start the alarm.

It is for example found that one thermocouple unit will generate a voltage sufficient to actuate the relay 10 when its hot and cold junctions differ in temperature by about 400° F. Thus, for a 1200° F. rise in temperature to insure an initiation of the alarm, each unit must have such thermal characteristics that its hot junction will reach a temperature of at least 400° F. in excess of that of its cold junctions when the unit is exposed to that temperature rise of 1200°. On the other hand, since the units are connected in series in the harness and their voltages are additive, the difference in junction temperatures of the several units of the harness, which is required to enable the harness as a whole to actuate the relay, is substantially in inverse proportion to the number of units employed. Accordingly, as normal ambient temperature changes—such as from engine starting or from sudden changes in flight level between hot and cold temperature regions—will affect the several units of the harness alike, the maximum amount and rate of change in ambient temperature to which the harness may be subjected without initiating any false alarms is determined by the number of the thermocouple units which are employed. In the present illustrative example, the harness has 11 separate thermocouple units. This means that the harness as a whole is capable of actuating the relay 10 when the difference in junction temperatures of the respective units is only approximately 35° F. This minimum differential junction temperature for the harness is found however to be sufficiently large to prevent any false alarms from being initiated by the normal changes in ambient temperature to which the harness is exposed.

It is found that when one of the thermocouple units of the harness which I provide is exposed suddenly to a hot air stream having a temperature of 1200° F. or more, the hot junction of the unit will reach a temperature in excess of that of the cold junction by 400° F. within a period of from 2 to 3.5 seconds—which is well within the standard limit commonly set at 5 seconds. This actuating period for one of the units, or interval of time between the immersion of the unit into the hot air stream and the initiation of the alarm by the unit, is a maximum value for the harness as a whole, for the actuating period is reduced in proportion to the number of units which are immersed simultaneously in a fire or hot air stream.

The desired thermal characteristics for the thermocouple harness are obtained by proper selection of the dimensions of the windows 70 relative to the hot and cold junctions and of the dimensions and materials used in the thermocouple unit 61 and armored cables 60. I find that the windows should terminate about midway between the hot and cold junctions. As for the different parts of the harness, I find that the size of the conductor wire 64, in view of the wire being embedded in the asbestos insulation 63, is a particularly important factor. For example, with other factors remaining the same, a harness using #18 gauge conductor wire will have almost a 2-times larger actuating period than will one using a #22 gauge conductor wire. In fact, because of the large controlling influence which the gauge of the conductor wire has on the thermal characteristics of the harness, the requirements for different applications can be met fully merely by selecting the gauge of this wire.

As is shown in Figure 6 the thermocouple harness is connected by cable 3 and by lead conductors 75 and 76 of cable 6 to the coil 28 of the meter relay 10, there being however serially included a resistance 77 in the conductor 75 for the purpose hereinafter explained. This circuit constitutes the controlling circuit for the alarm system. The load or controlled circuit for the system runs from the battery 7 through one lead of cable 5 to the lead conductor 75, through the resistance 77 just mentioned and a conductor 79 to one of the spring contact arms 47, through conductor 79a from the other of the spring contact arms to the lamp 11, and then through a conductor 78 of cable 6 and another lead of cable 5 to the other side of the battery. Thus when the thermocouple harness is temperature actuated its thermal voltage is impressed across the coil 28 of the meter relay to close the relay contact arms 47; load current will then be supplied by the battery to the lamp 11 to provide a light which will appear as red through the glass 12.

In addition to the controlling and load circuits having the common resistor 77, as is above described, the polarities of the thermocouple harness loop and battery 7 are so arranged in the system that the controlling and load currents will pass in opposite directions through this common resistor 77. Thus the potential drop of the load current through the resistor will appear in the controlling circuit with the same polarity as does the generated voltage of the thermocouple harness loop. It is this voltage drop of the load current through the resistance 77 that is relied upon to maintain the relay actuated, to keep the alarm in continuous operation after having been once initiated by the thermocouple harness. As typical values for the controlling circuit, the coil 28 may have a resistance of 4 ohms and be actuatable by 8 millivolts; and the resistance of the thermocouple harness may be 1½ ohms and the resistance of resistor 77 may be $\frac{1}{10}$ ohm. In the load circuit, the battery 7 may have a potential of 12 or 14 volts and may typically supply a load current of .3 ampere to the lamp 11. Thus, as soon as the relay is actuated to close the load circuit, the flow of the load current through the resistance 77 will generate approximately 30 millivolts potential in the controlling circuit. This potential will have the same polarity as that generated by the thermocouple harness and will be applied across the thermocouple harness and the coil 28, there being thus about 20 millivolts effective potential applied to the coil itself for the respective typical values of resistances above given. This actuating potential on the coil, being substantially higher than that required to actuate the relay, will serve to positively maintain the relay in actuated condition.

In order that the light furnished by the alarm system may be flashed and rendered thus more perceptible, a thermal circuit breaker 80 of standard form is serially provided in the load circuit. This circuit breaker, which is shown in detail in Figure 4, is mounted on two upstanding brackets 81 that are held to the base of the case 9 by the screws 19 aforementioned. The circuit breaker comprises two U-brackets 82 and 82' secured insulatedly to the brackets 81 and bridged by a flat spring 83 which is bent slightly to an S shape, the spring being welded at each end to these brackets. An arm 84 is welded to the end portion of the spring which is adjacent to the bracket 82, and connected between this arm and a pin 85 on the bracket 82' is a wire 86, the wire being however insulated from the arm 84 by a glass bead 84'. Insulatedly secured to the bracket 82' is an arm 88 carrying a contact member 89. This contact member normally engages the spring 83 in response to a tensioning of the wire 86. Current connections are made to the wire beyond the arm 84 and to the contact member 89. When the contact member and spring are closed the circuit is made through the wire 86. The flow of current through the wire however expands it and permits the spring and contact member to break connection; immediately thereafter the wire cools off and permits the connection to be restored, this alternate making and breaking of the circuit continuing thus automatically at a rate of about two times per second.

Although each opening of the load circuit removes the actuating torque on the coil 28 provided by the load current, the inertia of the coil prevents it from returning any substantial distance to zero position before the load circuit is again closed. However, a continuous actuating torque may be provided for the coil, if desired, by shunting the breaker 80 with a suitable resistance 90 (dottedly shown in Figure 6).

The alarm may be stopped and the system set for reoperation or the system may be tested for operability, merely by actuating a small pointer or lever 91 which is pivoted to the glass 12. As is shown in Figure 5, this lever controls a single-pole double-throw switch 92 comprising a pole member 93 and contact members 94 and 95. The pole member 93 and contact member 94 are clamped insulatedly in a stack 96 to an insulating plate 97 that is supported by the brackets 81 aforementioned, while the contact member 95 is mounted rigidly to this insulating plate. On the inner end of the shaft 91' of the lever 91 there is secured an arm 98 which is provided with two transverse pins 99, and secured to the end portion of the pole member 93 is an insulating bar 100 which extends between these pins. Thus as the lever 91 is rocked to the left and right, the pole member 93 is sprung into engagement with the respective contact members 94 and 95. As is shown in Figure 6 the pole member 93 is connected to the controlling circuit between the resistance 77 and the coil 28, the contact member 94 is connected to the other side of the coil, and the contact member 95 is connected through a resistance 101 to the conductor 73 of the load circuit. Thus when the lever 91 is rocked to the left, to a position designated as "reset" in Figure 1, it will cause the coil 28 to be shorted and to be then returned to zero position in response to the bias of its restoring springs 36 and 37. This, it will be seen, has the action of stopping the alarm and setting the system for reoperation. On the other hand, when the lever 91 is rocked to the right, to a position designated as "test," it will connect the battery 7 to the coil 28 through the resistance 101 with the same polarity on the coil as has the thermocouple harness, the resistance 101 being typically 2,000 ohms or more so as to reduce the impressed e. m. f. on the coil from the battery to a proper value. It will be noted that this circuit connection of the battery to the coil runs through the thermocouple harness. Thus, should the controlling circuit have proper continuity, the movement of the lever 91 to "test" will supply actuating current to the meter coil to give a complete check of the alarm system.

For a two-motored airplane, there may be provided two alarm systems, each having however the same battery 7. The junction box 4 will in this case have provision for connection to a second thermocouple harness, by way of a cable 3' (see Figure 1), and an instrument case 9' will be provided with two separate relays 10 and respective signal lights 11. These separate relays and lights may be appropriately located in the right and left halves of the instrument case, and be divided by a vertical baffle or partition 102 as is shown in Figure 8, the light in the left compartment being for the left motor and that in the right compartment for the right motor. By this arrangement the pilot will be able to ascertain immediately which motor is on fire when one of the alarm systems is set into operation.

The particular embodiments of my invention herein shown and described are intended to be illustrative and not limitative of my invention, as many changes and modifications may be made therein without departing from the true scope of my invention which I endeavor to express according to the following claims.

I claim:

1. A thermopile comprising a series of thermocouples, insulated conducting wire serially connecting said thermocouples at intervals, flexible armor covering the insulation of said wire, and metal tubes connected between the ends of said armor, said tubes forming housings for said thermocouples the walls of which are spaced from the thermocouples substantially by the thickness of said insulation, said walls having diametrically opposite openings at the hot junctions of said thermocouple.

2. A thermopile comprising a plurality of thermocouples having hot junctions, insulation-covered wire lengths serially connecting said thermocouples at intervals and forming cold junctions therewith, a continuous metal sheathing for the serial arrangement of said thermocouples, said sheathing covering the insulation of said wire and forming air chambers between said wire lengths for said thermocouples, said sheathing having openings at said hot junctions the lengths of which along the sheathing are substantially less than the distance between the cold junctions of each thermocouple.

3. A thermopile comprising a plurality of thermocouples, armored cable sections connecting said thermocouples at intervals in serial arrangement, and housing members for said thermocouples connected between said armored cable sections and having openings at said hot junctions, the hot and cold junctions of said thermocouples having a different temperature response to changing ambient temperature predetermined by the length of said openings and the gauge of the conductor wire of said cable sections.

4. A thermopile comprising a cable serially including at intervals a plurality of thermocouples, flexible metal sheathing covering the cable between adjacent thermocouples, and rigid metal housings for the thermocouples secured to said metal sheathing, each of said housings having an opening therein at the hot junction of the respective thermocouple.

5. A thermopile comprising a plurality of thermocouples each having hot and cold junctions, conductor wires serially connecting said thermocouples at intervals, flexible sheathing covering said conductor wires respectively, and rigid housings for the cold and hot junctions of said thermocouples, said housings being connected to said sheathing and comprising solid-walled portions surrounding said cold junctions and cage portions about said hot junctions whereby the hot and cold junctions of each thermocouple are differently exposed to the temperature of the outside ambient.

FREDERICK G. KELLY.

Certificate of Correction

Patent No. 2,410 218. October 29, 1946.

FREDERICK G. KELLY

It is hereby certified that error appears in the printed specification of the above numbered patent requiring correction as follows: Column 4, line 1, after the word "arms" insert *carry*; and that the said Letters Patent should be read with this correction therein that the same may conform to the record of the case in the Patent Office.

Signed and sealed this 2nd day of September, A. D. 1947.

[SEAL]

LESLIE FRAZER,
*First Assistant Commissioner of Patents.*